(12) United States Patent
Lysen et al.

(10) Patent No.: US 10,809,151 B2
(45) Date of Patent: Oct. 20, 2020

(54) SYSTEM AND METHOD FOR REMOTELY INTERROGATING MACHINE MONITORING SENSORS

(71) Applicant: Prüftechnik Dieter Busch AG, Ismaning (DE)

(72) Inventors: Heinrich Lysen, Garching (DE); Markus Abeltshauser, Scheyern (DE)

(73) Assignee: PRÜFTECHNIK DIETER BUSCH AG, Ismaning (DE)

( * ) Notice: Subject to any disclaimer, the term of this patent is extended or adjusted under 35 U.S.C. 154(b) by 237 days.

(21) Appl. No.: 16/013,669

(22) Filed: Jun. 20, 2018

(65) Prior Publication Data
US 2018/0372584 A1    Dec. 27, 2018

(30) Foreign Application Priority Data
Jun. 22, 2017   (DE) .................. 10 2017 113 807

(51) Int. Cl.
*G01M 13/00* (2019.01)
(52) U.S. Cl.
CPC .................... *G01M 13/00* (2013.01)
(58) Field of Classification Search
CPC ....... G01C 19/02; G01M 13/00; G08C 15/06; G08C 19/24; G08C 15/12
See application file for complete search history.

(56) References Cited

U.S. PATENT DOCUMENTS

| | | | | |
|---|---|---|---|---|
| 4,965,567 A | * | 10/1990 | Meyer | G05B 19/0423 370/458 |
| 5,583,493 A | * | 12/1996 | Lysen | H04Q 9/16 340/12.1 |
| 7,774,166 B2 | | 8/2010 | Lindberg et al. | |
| 8,290,723 B2 | | 10/2012 | Kortstock et al. | |
| 8,463,559 B2 | * | 6/2013 | Lohmann | G05B 19/0426 702/31 |
| 2007/0272023 A1 | * | 11/2007 | Dwyer | G01H 1/003 73/649 |

(Continued)

FOREIGN PATENT DOCUMENTS

| | | | | |
|---|---|---|---|---|
| DE | 4228047 A1 | * | 4/1993 | ............. G08C 15/06 |
| DE | 4328932 C2 | | 10/1998 | |
| DE | 10039542 A1 | | 4/2001 | |

(Continued)

*Primary Examiner* — Helen C Kwok
(74) *Attorney, Agent, or Firm* — Barlow, Josephs & Holmes, Ltd.

(57) ABSTRACT

The invention relates to a system for remotely interrogating sensor units for machine monitoring, comprising a measuring device and a plurality of sensor units which are connected in parallel with one another and are connected to the measuring device via a common line in order to transmit sensor measurement signals as an analog signal from the sensor unit to the measuring device and in order to receive a digital query signal from the measuring device, wherein the control unit operates the switch depending on the digital query signal in order to switch the analog measurement signal onto the line, wherein, at each time, only at most one of the sensor units can switch its analog measurement signal onto the line, and wherein the analog measurement signal is in the form of a current signal and the digital query signal is in the form of a voltage signal.

15 Claims, 2 Drawing Sheets

(56) References Cited

U.S. PATENT DOCUMENTS

Figure 1:
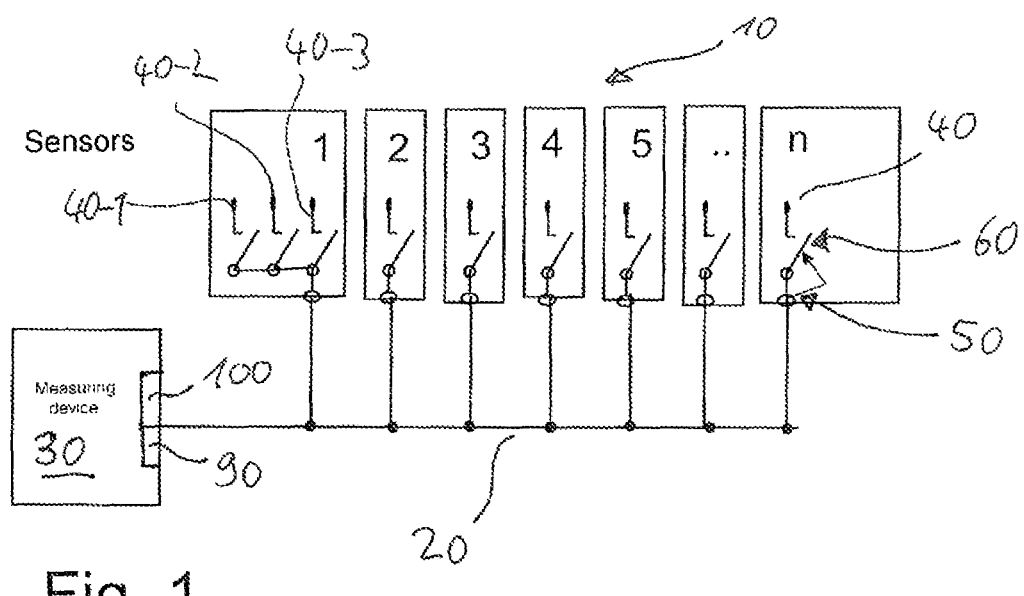

2016/0003874 A1\* 1/2016 Marien .................. G01R 15/14
324/96

FOREIGN PATENT DOCUMENTS

| DE | 10228389 B4 | 11/2006 |
|---|---|---|
| DE | 102006027462 A1 | 12/2007 |
| DE | 102006030963 A1 | 2/2008 |
| DE | 602004007995 T2 | 4/2008 |
| DE | 102007053223 A1 | 5/2009 |
| DE | 10054745 B4 | 7/2010 |
| DE | 102009001863 A1 | 9/2010 |
| DE | 102013225710 A1 | 6/2015 |
| DE | 212013000286 U1 | 11/2015 |
| DE | 102015207134 A1 | 10/2016 |
| EP | 1300657 A2 | 4/2003 |
| EP | 1860411 A2 | 11/2007 |
| WO | 2010074643 A1 | 7/2010 |
| WO | 2015113563 A1 | 8/2015 |

\* cited by examiner

SYSTEM AND METHOD FOR REMOTELY INTERROGATING MACHINE MONITORING SENSORS

BACKGROUND OF THE INVENTION

The invention relates to a system for remotely interrogating a plurality of sensor units for machine monitoring by a common measuring device.

In machine monitoring, in particular by vibration measurement, it is typically expedient to use a common measuring device to interrogate a plurality of sensors which are physically remote from the measuring device, and to evaluate the obtained measurement data in the measuring device.

DE 43 28 932 C1 describes a system for remotely interrogating a plurality of measurement points, wherein a plurality of vibration sensors are subdivided into groups which each comprise a plurality of the vibration sensors, wherein a dedicated multiplexer unit is provided for each group in order to sequentially individually connect each sensor of the group to a common measuring device. In this case, the individual multiplexers are connected in series, wherein in each case only one single analog line, which serves to transmit the corresponding vibration sensor signal as a current signal, is provided between the measuring device and the multiplexer which is situated closest to the measuring device and also between two adjacent multiplexers. In this case, the multiplexers are each in the form of counters which are further switched by a change in the voltage on the analog line, the said change being effected by the measuring device. In this case, the voltage source of the measuring device serves not only to actuate the counters, but also to generate the current signal of the individual sensors. In this case, each sensor is connected to the multiplexer of its group via a dedicated line.

It is further known to connect a common measuring device to external field devices, for example sensors, via a common analog 4-20 mA cabling arrangement, wherein an industry protocol known as HART (Highway Addressable Remote Transducer) is used. In this case, the common analog line forms the analog channel for the main process variable which is transmitted as a current signal, while at the same time a digital channel is implemented by a modulation of the current signal by FSK (Frequency Shift Keying), wherein a "1" is coded by a frequency sequence of 1200 Hz and "0" is coded with a frequency sequence of 2200 Hz. This communication protocol can be used as point-to-point topology with a single field device or as multidrop topology with up to 64 field devices which are connected to the measuring device by a common line and are each individually addressed, wherein analog signal transmission via the common line is no longer possible in the case of a multidrop topology.

SUMMARY OF THE INVENTION

The object of the present invention is to provide a system for remotely interrogating sensor units for machine monitoring by vibration measurement, in which system the expenditure on measurement and wiring is as low as possible. A further object is to provide a corresponding method.

According to the invention, this object is achieved by a system and method of the present invention.

In the case of the solution according to the invention, it is advantageous that, since each sensor unit has a dedicated switch and a dedicated control unit which is designed in order to operate the switch depending on the digital query signal, which is generated by the measuring device, in order to switch the analog measurement signal onto the line, a central multiplexer for the sensor signals is not required, and therefore the system can be realized in as decentralized a manner as possible and therefore in a particularly simple manner.

Preferred refinements of the invention are discussed in detail herein.

BRIEF DESCRIPTION OF THE DRAWING FIGURES

Figure 2:
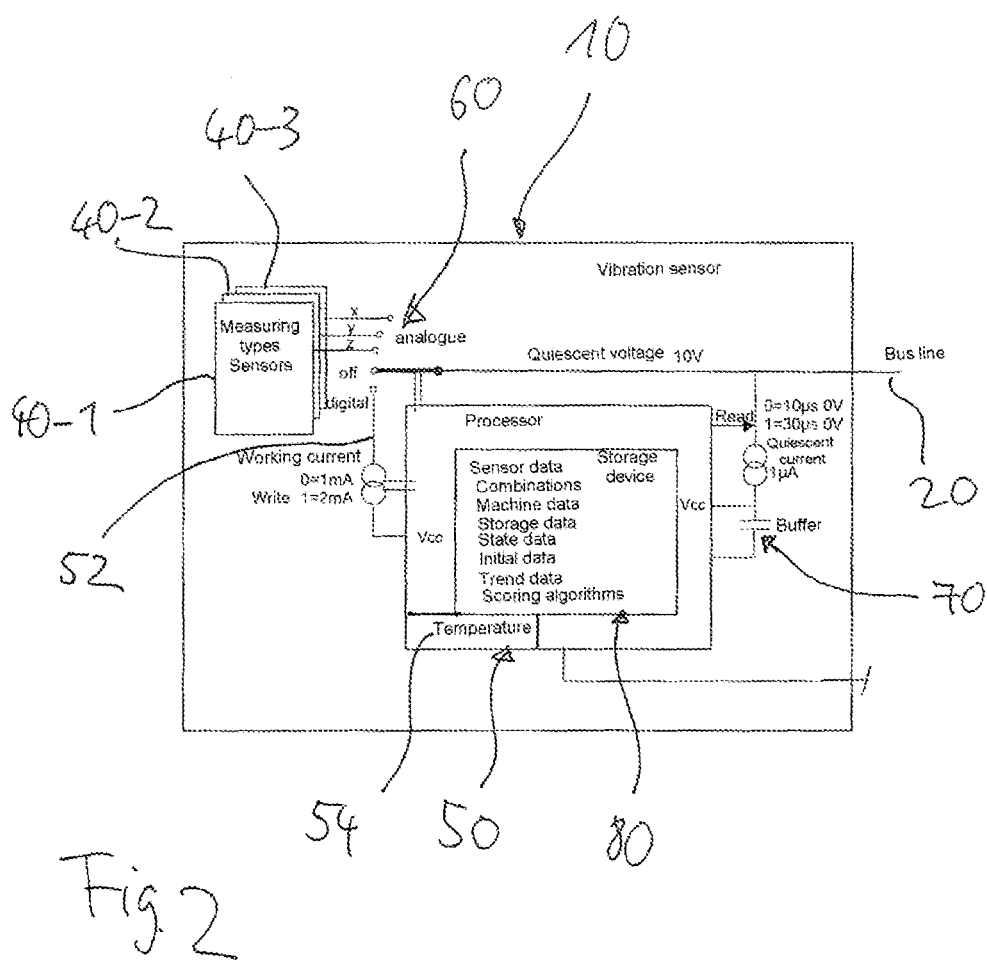

The invention will be explained by way of example in more detail below with reference to the appended drawings, in which:

FIG. 1 shows a block diagram of an example of a system according to the invention for remotely interrogating sensor units; and FIG. 2 shows a block diagram of an example of one of the sensor units of the system from FIG. 1.

DESCRIPTION OF THE INVENTION

FIG. 1 schematically shows a block diagram of an example of a system for remotely interrogating a plurality 10 of sensor units 10-1, 10-2, 10-3, 10-4, 10-5, ..., 10-$n$ which are connected in parallel with one another and are connected to a common measuring device 30 via a common line 20. Each of the sensor units 10 has at least one vibration sensor 40, a control unit 50, a switch 60, a storage device 70 for electrical energy for supplying the control unit 50, and also a data storage device 80.

The common line 20 serves firstly to transmit signals of the sensors 40 of the control unit 10 as a current signal, that is to say as a signal with a current level proportional to the measured sensor value, to the measuring device 30, and secondly to transmit a digital signal, which is implemented as a voltage signal, from the measuring device 30 to the sensor units 10 (a digital signal of this kind which is sent from the measuring device 30 to the sensor units 10 can be considered to be a query signal). The common line 20 can further also be used in order to transmit digital signals from the sensor units 10 to the measuring device 30, wherein a signal of this kind can then be implemented as a current pulse (a digital signal of this kind which is sent from a sensor unit 10 to the measuring device 20 can be considered to be a response signal).

Each control unit 50 is designed in order to operate the switch 60 depending on the digital signal, which is generated by the measuring device 30, in order to switch the vibration sensor or one of the vibration sensors 40 of the corresponding sensor unit 10 onto the common line 20, wherein, at each time, only at most one of the sensor units can switch one of its sensors 40 (and therefore the corresponding analog measurement signal) onto the line 20.

The measuring device 30 has a voltage source 90 in order to generate both the digital voltage signal for actuating the sensor units 10 and also the current signal when the corresponding sensor 40 is switched by the sensor unit 10, which has just been interrogated, onto the line 20. The measuring device 30 further has a data-processing device 100 in order to obtain digital measurement values from the current signal on the line 20 for further evaluation.

The digital voltage signal can be implemented, for example, as pulse duration coding or as pulse frequency coding; for example, as indicated in FIG. 2, "0" can be coded by an absence of voltage of the line 20 (that is to say 0 volt)

for 10 μs and "1" can be coded by an absence of voltage of the line 20 for 30 μs. In this case, a reset can be implemented by the line 20 exhibiting an absence of voltage for a substantially longer period of time, for example at least 3 seconds, wherein a reset leads to all of the sensor units 10 beginning to listen and then switching off after a specific time, for example after one second, if they do not receive a different command. A clock can be implemented, for example, by the line 20 exhibiting an absence of voltage for a shorter period of time, for example approximately 100 ms, before each command to be transmitted, wherein all of the sensors then begin to listen and switch off again, for example after 100 ms, if a different command is not received. A count can be implemented, for example, by the line exhibiting an absence of voltage for a specific period of time, for example 10 ms, wherein each counter of the sensor units 10 then advances by 1.

The energy storage device 70 in each sensor unit 10 is fed by the voltage source 90 of the measuring device 30 via the line 20 and serves to supply electrical energy to the sensor unit during the times at which the line 20 exhibits an absence of voltage. The energy storage device 70 is preferably in the form of a supercap.

The digital components of the sensor units 10 should, in principle, be designed such that they interfere with the analog current signal transmission as little as possible, wherein particularly low-noise standby currents, for example not more than 1 μA, are advantageous.

The individual sensor units 10 are addressed by the measuring device 30 in a sequential manner according to one embodiment, wherein each sensor unit 10 then has a counter for counting voltage pulses on the line 20, wherein a specific number is allocated to each sensor unit 10, and wherein the corresponding sensor unit 10 switches its sensor 40 or one of its sensors onto the line 20 when the number which is allocated to it is reached in the counter.

According to an alternative embodiment, a dedicated address can be allocated to each sensor unit 10, it being possible for each said sensor unit to be addressed by the measuring device 30 by the digital signal using the said dedicated address. By way of example, the address can comprise some of the digits of the serial number of the respective sensor unit 10. The said digits may be, for example, the last two numerals of the serial numbers which are then transmitted, during the initialization of the system, from the sensor units 10 as a digital current signal to the measuring device 30 via the line 20. The last two numerals of the serial numbers can be transmitted, for example, by the corresponding sensor unit 10 additionally applying a current pulse of 1 mA onto the line 20 for 1 ms after Y ms when the two last numerals of the serial number yield the number Y, wherein the sensor units 10 are then switched off, for example, after 100 ms. The corresponding numerals of the serial number can also be digitally transmitted.

A measurement command of the control device 30 can have, for example, the following structure: (address of the desired sensor unit; measurement period; measurement type or desired sensor). After the measuring device 30 has applied a measurement command of this kind as a digital voltage signal onto the line 20, the addressed sensor unit 10 switches the desired sensor onto the line 20 for the desired measurement period, while all of the other sensor units are switched off.

As indicated in FIG. 2, digital signals can be sent from a sensor unit 10 to the measuring device 30 by a specific current level, for example 1 mA, representing "0", and a second current level, for example 2 mA, representing "1". In this case, the switch 60 can then be designed such that a digital output 52 of the control unit 50 is switched onto the line 20 for the purpose of sending digital signals from the sensor unit 10.

In principle, the digital signal transmission between the measuring device 30 and the sensor unit 10 can be implemented as a so-called single-wire bus.

As shown in FIG. 2, a sensor unit 10 can have a plurality of vibration sensors 40-1, 40-2, 40-3 or a vibration sensor having different outputs, wherein the switch 60 is then designed such that in each case only one of the vibration sensors or only one of the outputs are switched onto the line 20 at a specific time. By way of example, the vibration sensor 40 may be a sensor for separate vibration measurement along three axes which are perpendicular in relation to one another, wherein the signals of the individual axes can then be sequentially switched onto the line 20, so that the measuring device 30 can ultimately sequentially read the individual physical axes of the vibration sensor. In this way, a plurality of measurement types, which the measuring device 30 can selectively access, can be implemented in a single sensor unit 10.

As shown in FIG. 2, a sensor unit 10 can also have, in addition to the vibration sensor or the vibration sensors, a temperature sensor 54, the temperature signal of which is sent as a digital signal, for example as a digital current signal, to the measuring device 30 via the line 20.

The data storage device 80 is preferably used to store information which relates to the vibration sensor or the vibration sensors of the respective sensor unit 10 and/or the measurement point of the corresponding sensor and can be taken into account when evaluating the sensor signals, wherein the corresponding data can then be sent, as required, as a digital current signal to the measuring device 30 via the line 20. The said data may be, for example, sensor data, machine data, combinations, storage data, state data, initialization data, trend data and/or scoring algorithms. Premeasured measurement values can also be stored in the data storage device 80. The scoring criteria can comprise, for example, filter types, filter settings, measurement types, analysis types, measurement times, limit values etc. In this way, remote measurements can be performed and the corresponding remote measurement points can be assessed, without the measuring device 30 first having to be loaded with measurement location-specific measurement and assessment criteria; instead, the corresponding sensor units 10 themselves supply the required data to the measuring device 30.

The line 20 is preferably a coaxial cable.

The control units 50 preferably have a non-volatile ultra-low-power ferrite RAM microcontroller.

It would be appreciated by those skilled in the art that various changes and modifications can be made to the illustrated embodiments without departing from the spirit of the present invention. All such modifications and changes are intended to be covered by the appended claims.

What is claimed is:

1. A system for remotely interrogating sensor units for machine monitoring, comprising:
   a measuring device and a plurality of sensor units which are connected in parallel with one another and are connected to the measuring device via a common line in order to transmit sensor measurement signals as an analog measurement signal from the plurality of sensor units to the measuring device and in order to receive a digital query signal from the measuring device;

wherein each sensor unit of said plurality of sensor units has at least one vibration sensor, a control unit and a switch, wherein the control unit is designed in order to operate the switch depending on the digital query signal in order to switch the analog measurement signal onto the line, wherein, at each time, only at most one of the sensor units can switch a respective analog measurement signal onto the line; and wherein the analog measurement signal is a current signal and the digital query signal is a voltage signal.

2. The system according to claim 1, wherein the measuring device has a voltage source to generate both the digital query signal and the current signal when the corresponding sensor is switched onto the common line.

3. The system according to claim 2, wherein each said sensor unit has a storage device for electrical energy for supplying the respective sensor unit, said storage device is fed by the voltage source of the measuring device via the common line.

4. The system according to claim 3, wherein the storage device is a supercap.

5. The system according to claim 1, wherein the sensor units are sequentially addressed by the measuring device, wherein each said sensor units has a counter for counting voltage pulses on the common line, wherein a number is allocated to each said sensor units, and wherein the corresponding sensor unit switches a respective vibration sensor or one of a respective sensors onto the common line when the number which is allocated to it is reached in the counter.

6. The system according to claim 1, wherein a dedicated address is allocated to each said sensor unit, each said sensor unit being addressable with commands by the measuring device by the digital voltage signal using the dedicated address.

7. The system according to claim 6, wherein the address comprises some of digits of a serial number of the sensor units.

8. The system according to claim 1, wherein the digital voltage signal uses pulse duration coding or pulse frequency coding.

9. The system according to claim 1, wherein the sensor units send digital response signals configured as current signals to the measuring device via the common line.

10. The system according to claim 1, wherein a transmission of the digital query signal between the measuring device and the sensor units is implemented as a single-wire bus.

11. The system according to claim 1, wherein at least one of the sensor units has a storage device for storing information which relates to the sensor and/or a measuring point of the sensor and is to be taken into account when evaluating the sensor signals, wherein the control unit of the respective sensor unit sends the information as a digital response signal to the measuring device via the common line.

12. The system according to claim 1, wherein at least one of the sensor units has a temperature sensor and sends a temperature signal as a digital signal to the measuring device via the common line.

13. The system according to claim 1, wherein at least one of the sensor units has a plurality of vibration sensors or a vibration sensor having a plurality of different outputs, wherein the control unit and the switch are configured to switch in each case only one of the vibration sensors or only one of the outputs onto the common line.

14. The system according to claim 13, wherein the vibration sensor is a sensor for separate vibration measurement along three axes which are perpendicular in relation to one another, wherein the control unit and the switch are configured to sequentially switch a signal of the individual axes onto the line.

15. A method for remotely interrogating a plurality of sensor units for machine monitoring by a measuring device, wherein the sensor units are connected in parallel with one another and are connected to the measuring device via a common line to transmit sensor measurement signals as an analog measurement signal from the sensor units to the measuring device and to receive a digital query signal from the measuring device, wherein each said sensor unit has at least one vibration sensor, a control unit and a switch, wherein the control unit operates the switch depending on the digital query signal in order to switch the analog measurement signal onto the line, wherein, at each time, only at most one of the sensor units can switch the respective analog measurement signal onto the line, and wherein the analog measurement signal is a current signal and the digital query signal is a voltage signal.

* * * * *